I. E. STOREY.
THERMOSTAT.
APPLICATION FILED MAR. 3, 1914.
1,190,205.
Patented July 4, 1916.
2 SHEETS—SHEET 1.
Fig. 1
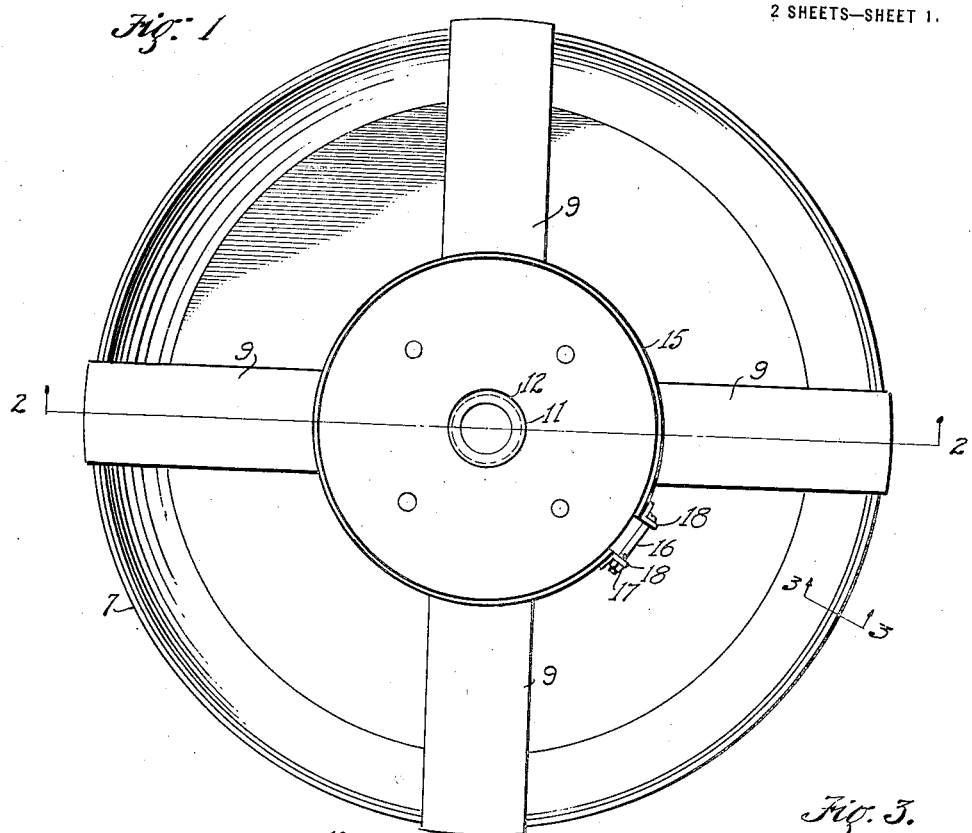
Fig. 2.
Fig. 3.
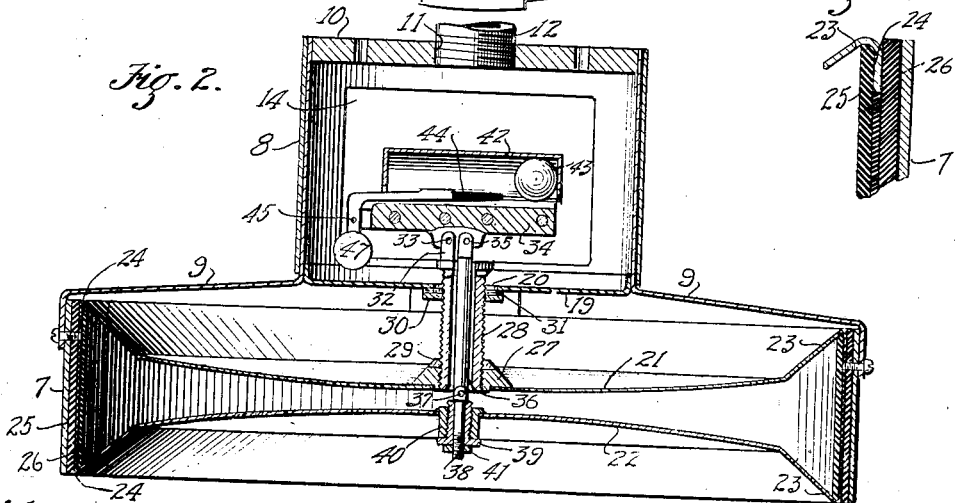
Witnesses:
James M. Attix
Marguerite Bates
By
Inventor:
Imle E. Storey
Howard & Strause
Attys.

I. E. STOREY.
THERMOSTAT.
APPLICATION FILED MAR. 3, 1914.
1,190,205.
Patented July 4, 1916.
2 SHEETS—SHEET 2.
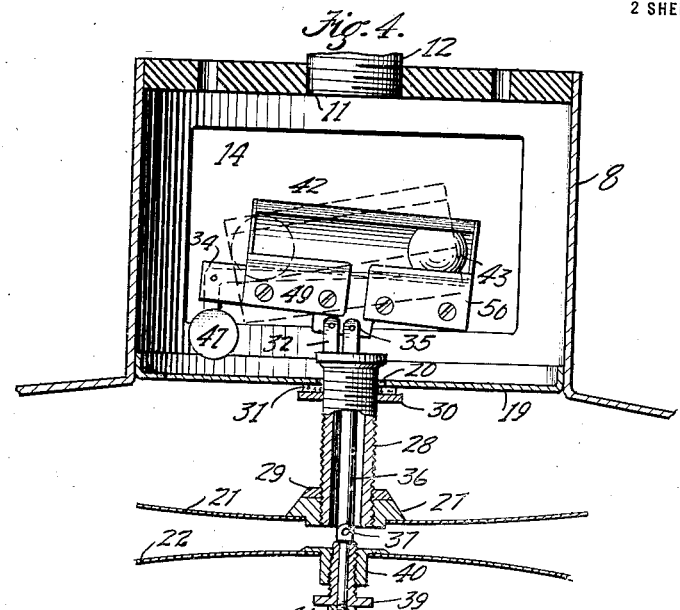
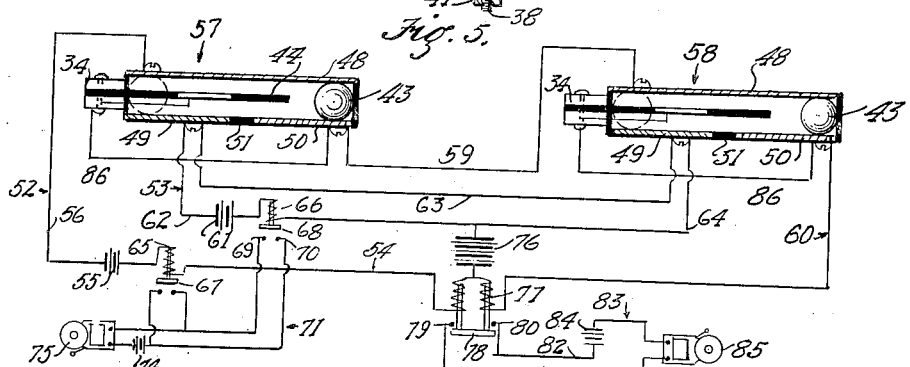
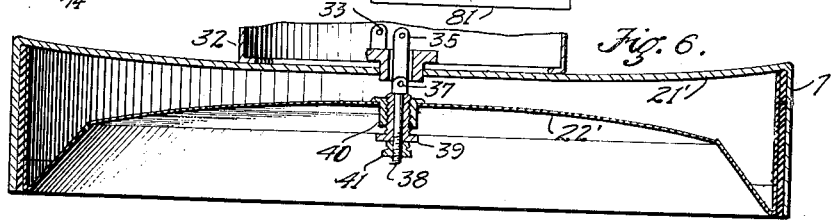
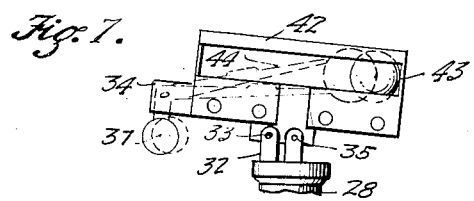
Witnesses:
James M. Abbott
Marguerite Bater
Inventor.
Innie E. Storey.
By
Attys.

UNITED STATES PATENT OFFICE.

IMLE E. STOREY, OF LOS ANGELES, CALIFORNIA.

THERMOSTAT.

1,190,205.

Specification of Letters Patent.

Patented July 4, 1916.

Application filed March 3, 1914. Serial No. 822,123.

*To all whom it may concern:*

Be it known that I, IMLE E. STOREY, a citizen of the United States, residing at Los Angeles, in the county of Los Angeles, State of California, have invented new and useful Improvements in Thermostats, of which the following is a specification.

This invention relates to a thermostat, and particularly pertains to a thermostat for controlling electrical circuits.

The principal object of this invention is to provide a thermostat including an expansible and contractible plate having a concavo-convex surface formed under stress and having its outer periphery so engaged as to inhibit sudden lateral expansion of the plate, whereby the plate will be caused to have a surface expansion when subjected to heat to effect a movement of the plate at right angles to its plane.

It is the object of this invention to provide a thermostat which is particularly applicable for use in connection with electrically operated fire alarm systems, and which thermostat is so constructed as to sound an alarm when influenced by a rapid rise in temperature, but which will not effect the operation of the alarm on a slow increase in temperature.

A further object is to provide a thermostat of the above character which is adjustable to operate at predetermined differences of temperature to sound an alarm.

A further object is to provide an electrical circuit controlling thermostat so constructed and arranged as to maintain both lines of a signal circuit closed with a weak current to maintain the lines in test when the thermostat is in a normal condition, and which thermostat will operate when actuated by a rapid increase in temperature to direct an intensified current over the signal lines to sound an alarm.

Another object is to provide means in a thermostat, whereby its operation by vibration or sudden jars will be inhibited.

A further object is to provide a thermostat of the above character which is compact, simple in construction and reliable in operation.

The invention primarily resides in a thermostat having a concavo-convex disk formed under stress, means for confining the plate at its peripheral edge to inhibit sudden lateral expansion thereof, by which expansion of the plate will cause a movement thereof in a direction at right angles to its plane.

The invention is illustrated in the accompanying drawings, in which:

Figure 1 is a plan view of the thermostat. Fig. 2 is a vertical section on the line 2—2 of Fig. 1. Fig. 3 is an enlarged detail section on the line 3—3 of Fig. 1. Fig. 4 is an enlarged detail in section of the thermostat illustrating the manner of operating the same. Fig. 5 is a view in diagram illustrating the application of the invention. Fig. 6 is a detail section of a modified form of the thermostat. Fig. 7 is a detail in elevation illustrating the operation of the device for preventing the operation of the thermostat by vibration.

In the construction of thermostats for fire alarm systems considerable difficulty is encountered by reason of the thermostat being accidentally operated either by vibration or jars, or by the natural increase in temperature to a point sufficient to effect the operation of the thermostat, and in providing a construction by which the thermostat will be rendered compact. These difficulties are fully met by the construction hereinafter described, which furthermore, includes means whereby an electric alarm system will be maintained in test so as to operate an auxiliary alarm to indicate damage to the signal circuit controlled by the thermostat.

Referring to the drawings, particular reference being had to Figs. 1 to 3, inclusive, showing the preferred form of the invention, 7 indicates a band of poor heat conducting material which forms an annular exterior binding wall for the thermostat and which band is connected to a housing 8 arranged thereabove by means of radially extending straps 9. The housing 8 is closed at its upper end by means of a cap-disk 10 formed with an internally threaded central opening 11 arranged concentric with the housing 8 and the band 7, which cap-disk is preferably formed of insulating material and is adapted to be screwed on the lower end of a dependent supporting member 12 by which the thermostat may be securely held with the band 7 extending horizontally. The housing 8 is provided with openings 14 on its sides through which access may be readily had to its interior; these openings being normally closed to exclude dust by means of a divided band 15 which encompasses the housing 8 and is secured thereto by means of a bolt 16 and nut 17; the bolt and nut connecting flanges 18 on the ends of the split band 15, as particularly shown in Fig. 1. The lower portion of the housing 8 is closed by means of a bottom plate 19 formed with a central opening 20.

Arranged within the space inclosed by the band 7 is a pair of spaced horizontally extending thermostat disks 21 and 22 of peculiar shape and construction. Each of these disks is formed with a central concavo-convex diaphragm portion joined with divergent frusto-conical walls which form the annular margins thereof; the pair of disks being arranged in opposed relation to each other.

The disks are preferably spun in the shape set forth so that the material of which they are composed will be under internal stress, whereby a greater range of movement or surface expansion of the disks will be effected when they are subjected to heat than would be possible were they at normal. Formed on the outer marginal edges of the disks 22 are oppositely extending flanges 23 and 24 which are engaged between bands 25 and 26 of a suitable insulating material. The bands 25 and 26 are cemented together and form a support and connection for the disks 21 and 22 the outer band 26 being connected to the inner periphery of the metallic band 7, whereby the disks 21 and 22 will be supported by the band 7 and insulated therefrom. The disks 21 and 22 are formed of a material, such as copper, which will tend to quickly expand on a sudden rise of temperature, while the band 7 is formed of material slow to expand on sudden increase of temperature, such as steel; the insulating bands 25 and 26 being formed of a material having a low heat conducting property so as to prevent radiating of heat from the disks 21 and 22 to the band 7. The band 7 is provided for the purpose of restricting the disks 21 and 22 from expanding laterally in the general direction of their plane so that when expansion does occur the concavo-convex diaphragm portions of the disks will bulge at right angles to their planes and effect a movement toward each other. By this construction a comparatively large range of relative movement of the disks is obtained with a slight increase of temperature, and extreme sensitiveness results.

Formed centrally of the upper disk 21 is an internally threaded shoulder 27 rigidly affixed to the disk 21 and adapted to receive the lower end of an externally threaded tube 28, the upper end of which projects through the opening 20 into the interior of the housing 8. The tube 28 is adjustable in relation to the disk 21 by screwing it in or out of the shoulder 27; a lock-nut 29 being screwed thereon against the shoulder 27 to retain the tube in its adjusted position. This construction permits of a delicate adjustment of the device so that it can be set to operate at predetermined differences of temperature.

As a means for resiliently closing the opening 20 to prevent the passage of dust therethrough, a nut 30 having a fiber washer 31 on its upper face is screwed on the tube 28 in such position that the washer 31 will close the opening 20, which washer will permit of a slight longitudinal movement of the tube 28 without unsealing the opening 20.

Formed on the upper end of the tube 28 is a lug 32 supporting a pivot pin 33 on which a tiltable block 34 is mounted, and pivotally connecting with the block 34 at 35 is a downwardly extending stem 36 which projects through the tube 28 and has its lower end pivotally connected at 37 to a stem 38 passing through the externally threaded nut 39 screwed for adjustment in an internally threaded collar 40 rigidly affixed to the lower disk 22. The lower end of the stem 38 projects beyond the nut 39 and is threaded to receive a lock nut 41 by which the stem 38 is clamped to the nut 39. The block 34 extends longitudinally at right angles to the pivots 33 and 35 and is formed with a run-way 42 on its upper face, in which a ball 43 is adapted to travel from end to end of the block when the latter is tilted in either direction. The ball 43 being normally positioned at the end of the block 34 nearest the stem 36, as shown in full lines in Fig. 3; the block being normally positioned with this end lowermost.

As a means for preventing accidental displacement of the ball 43, as might be occasioned by sudden jolt or jar of the thermostat casing, a bent arm 44 is provided. This arm being pivoted at 45 at one end of the block 34 and projecting longitudinally thereof in a groove 46 formed in the bottom of the run-way 42 to receive it. The upper and outer end of the arm 44 is normally positioned a short distance from the ball 43, as particularly shown in Fig. 2; the arm 44 thus extending parallel with the block 34 and bent downwardly to the pivot 45 with its dependent portion having a weight 47 formed thereon. The weight 47 exerts a direct downward pull centrally on the pivot 45 and maintains the arm 44 in its normal horizontal position. In event of a jar being directed on the thermostat casting the weight 47 will be caused to oscillate and thereby move the outer portion of the arm 44 into the position indicated in dotted lines before the inertia of the ball 43 is overcome by the jar sufficiently to cause it to rotate so that when the ball 43 is advanced it will impact against the end of the arm 44 and thereby prevent it from traversing the run-way 42.

The ball 43 constitutes a gravity operated electrical contact member and is designed to make and break certain circuits while in different positions on the run-way 42. For this purpose the block 34 is provided with a contact member 48, which extends throughout its length on one side thereof and against which the ball 43 normally contacts; this plate 48 being insulated from the block 34 and the arm 44. If desired, the block 34 may be formed of non-conducting material.

Mounted on the opposite side of the block 34 are spaced contact plates 49 and 50 which extend toward each other from the ends of the block 34 and terminate a short distance apart so as to be insulated from each other by insulation 51, which may consist of suitable insulating material or merely an air gap.

The circuits to be controlled by the thermostat previously described may be varied to suit conditions, but, for the purpose of disclosing the functions of the several contact members and to facilitate description of the operation of the invention, is arranged as shown in Fig. 4.

In the application of the invention, two normally closed separate circuits, indicated at 52 and 53 are employed, which circuits collectively form a third normally open circuit 54 and normally constitute test lines therefor; any suitable number of thermostats comprising the present invention being interposed between the circuits 52 and 53 on the circuit 54 as occasion may require, and in the manner herein described.

The closed circuit 52 comprises a battery 55, one terminal 56 leading to the contact member 48 on a thermostat 57 disposed at any convenient point, which thermostat is electrically connected with a second thermostat 58 by means of a conductor 59 which leads from the contact plate 50 on the thermostat 57 and connects with the contact plate 48 on the thermostat 58; the contact plate 50 on the thermostat 58 connecting with the other terminal of the battery 55 through a conductor 60, thereby completing a normally closed circuit from the battery 55 by reason of the contact members, 48 and 50 on the thermostats 57 and 58 being electrically connected by the balls 43. Any number of thermostats may be thus connected in series on the closed circuit from the battery 55, as occasion may require.

The normally closed circuit 53 consists of a battery 61, one terminal of which connects with a conductor 62 leading to the contact plate 49 on the thermostat 57 from which a conductor 63 leads and connects with the corresponding contact plate 49 on the thermostat 58 next in series with the thermostat 57; a conductor 64 leading from the contact plate 49 and connecting with the other terminal to the battery 61 to complete the circuit. The contact plates 49 are thus disposed in series on the circuit 53.

Arranged in the circuits 52 and 53 are magnets 65 and 66, which are normally energized by the current flow from the batteries 55 and 61 and are provided for the purpose of normally maintaining switch contact members 67 and 68 out of connection with the contact members 69 and 70 on an auxiliary test alarm circuit 71, comprising conductors 72 and 73 leading from a battery 74 and having an alarm bell 75 thereon.

The test alarm circuit 71 is normally opened by the switch members 67 and 68 and is designed to be closed when either the circuit 52 or 53 becomes broken to cause the deenergizing of the magnets 65 or 66, whereby the latter will release the switch members 67 or 68 to close the circuit 71 and thereby sound an alarm through the electric bell 75. This arrangement is provided for the purpose of indicating trouble on the line circuits 52 and 53 so that these circuits may be in constant test. The circuits 52 and 53 are connected with the opposite terminals of a battery 76, which battery normally performs no function by reason of the circuits 52 and 53 being open in relation to each other.

Disposed on the conductor 60 is a pair of magnets 77 which are provided for the purpose of tripping a catch to actuate a switch contact member 78 to complete a circuit through contact members 79 and 80 on conductors 81 and 82 of an alarm circuit 83 having a battery 84 and an electric alarm bell 85 thereon. The magnets 77 are so wound as to oppose each other when a ball 43 is in the position shown in full lines in Fig. 5 and not be sufficiently energized by the current flow from the battery 55, but when a ball 43 is in the position shown in dotted lines in Fig. 5 the windings augment each other, and will be sufficiently energized from the energy delivered thereto from the battery 76 to cause the switch member 78 to move into connection with the contact members 79 and 80 to complete the alarm circuit 83 and sound the alarm bell 85.

In the operation of the thermostat and signal system, let it be assumed that the parts are in the normal position shown in full lines in Figs. 2, 3 and 4, and that a sudden heat is caused to impinge on the thermostat disks 21 and 22, thereby causing rapid surface expansion of the same and thus effecting movement of the curved portions of the disks 21 and 22 in opposite directions, or toward each other. This operation will cause the pivot pin 33 to move downwardly and the pivot pin 35 to move upwardly in relation to each other by reason of the connection of the former, through the tube 28, with the disk 21 and the connection of the pivot pin 35 with the disk 22 through the stem 36. This action will operate to tilt the block 34 into the position indicated in dotted lines in Fig. 3, and thereby cause the ball 43 to travel down the run-way 42 over the arm 44 into electrical connection with the contact plate 49, thereby completing a circuit from the battery 76 through the closed circuit 52, contact members 48 and 49 and circuit 53, thereby energizing the magnets 77 and sounding the fire alarm through the bell 85. When the block 34 is thus rocked by the thermostat, movement of the ball 43 will be effected before the block has been rocked sufficiently forward to dispose the arm 44 in the path of travel of the ball so that the latter will ride over the arm 44 into the position indicated in dotted lines in Figs. 3 and 4.

As a means for insuring the closing of the circuit 54 in event the conductors 56 and 59 or 60 become broken, a safety connection is provided in the circuit 52 which consists of a conductor 86, which electrically connects the contact plate 50 of each thermostat with its arm 44 at the pivotal connection of the latter. By this arrangement when the ball 43 passes into connection with the contact member 49 it will also complete electrical connection with the arm 44 in passing from the plate 50 so that if either of the conductors 56, 59 or 60 are broken the signal circuit 54 will be completed through the conductor 86. Assume that conductor 59 is broken and that thermostat 58 operates, current will then flow from battery 76 along conductor 64, along contact member 49, through ball 43 to arm 44, through conductor 86 to contact member 50 and along conductor 60 to the other side of the battery 76. If thermostat 57 operates when conductor 59 is broken current flows from the battery 76 along conductor 62 to contact member 49, through ball 43 to contact member 48, along conductor 56 to the other side of the battery. If conductor 60 breaks and thermostat 58 operates, then current flows from battery 76 along conductor 64 to contact member 49, through ball 43, through conductor 59 to contact member 50 in thermostat 57, through ball 43 to contact member 48, along conductor 56 to the other side of the battery. If thermostat 57 operates when conductor 60 is broken, current flows from battery 76 along conductor 62 to contact member 49, through ball 43 to conductor 56, and back to the other side of the battery. If conductor 56 breaks and thermostat 58 operates current flows from battery 76 through conductor 64 contact member 48 of thermostat 58, through ball 43 to arm 44, along conductor 86 to contact member 50 and along conductor 60 to the other side of the battery. If conductor 56 breaks and thermostat 57 operates, current flows from the battery 76 along conductor 62 to contact member 49, through ball 43 to arm 44, through conductor 86 to contact member 50, along conductor 59 to contact member 48 of thermostat 58, through ball 43 along conductor 60 and back to the other side of the battery.

An important feature of this invention resides in the fact that the thermostat will operate to actuate the ball 43 only by a rapid increase of temperature. This feature is obtained by the construction and arrangement of the thermostat disks 21 and 22 and the band 7, by which the latter is insulated from the former and by which the disks are held against lateral expansion. The heat insulation about the band 7 does not conduct heat as readily to the band 7, therefore it does not expand as quickly as disks 21 and 22 thereby effecting a rapid surface expansion of the plates and a consequent movement thereof before any perceptible expansion of the band 7, which is slow to expand, takes place, whereas when the thermostat is subject to a slow rise in temperature, the band 7 will expand nearly uniformly with the disks 21 and 22 thereby allowing the latter to expand laterally so as not to effect a sufficient vertical movement of the latter in relation to each other to cause effective operation of the rocking bar 34.

By adjusting the nut 39 the inclination of the rocking block 34 may be varied so that the moment at which the ball 43 will be caused to move can be varied according to any predetermined point of temperature, as occasion may require.

In the modified form of the invention shown in Fig. 6, a single disk 22' of a material having rapid expansibility, and a disk 21' of a slow expansibility is provided; the disk 21' being formed integral with the band 7 and connected to the support 32 on which the block 34 is mounted. While this construction will operate in the same manner as described in reference to the preferred form shown in Fig. 2, on being subjected to a rapid rise in temperature its range of movement is less and consequently its sensitiveness is not as great.

I claim:

1. In a thermostat, a tilting member having a plurality of electrical contact members affixed thereon, a gravity operated contact member carried by said tilting member, an expansible and a contractible element connected to the tilting member for actuating the same, and means to prevent the operation of the tilting member except on a sudden increase of temperature.

2. A thermostat, comprising a concavoconvex thermostatic disk formed of a sensitive heat conducting material, a support for said disk formed of a less sensitive heat-conducting material thermically insulated from said disk to prevent the rapid absorption of heat by the supporting member, said support engaging said disk to prevent a sudden lateral expansion thereof.

3. A thermostat, comprising a concavo-convex thermostatic disk formed of sensitive heat-conducting material, a support for said disk formed of a less sensitive heat-conducting material thermically insulated from said disk to prevent the rapid absorption of heat by the supporting member, and means operable by the sudden expansion of said disk for actuating a signal.

4. A thermostat, comprising a concavo-convex expansible and contractible disk formed of sensitive heat-conducting material, a ring of less sensitive heat-conducting material supporting and engaging said disk and thermically insulated therefrom to prevent the rapid absorption of heat by the said ring, a tilting member connected to said disk adapted to be actuated thereby, and a gravity operated device on said tilting member adapted to be shifted by the movement of said member on expansion of said disk.

5. A thermostat, comprising a concavo-convex expansible and contractible disk formed of a sensitive heat-conducting material, a ring formed of a less sensitive heat-conducting material and supporting and engaging said disk and thermically insulated therefrom to prevent the rapid conduction of heat from the disk to the ring, a tilting member connected to said disk and adapted to be actuated thereby, a gravity operated device on said tilting member adapted to be shifted by the movement of said member on expansion of the disk, and means for preventing excessive movement of the gravity operated member when the thermostat is subjected to sudden jar.

6. In a thermostat, a tilting member, a series of electrical contact members affixed thereon, a gravity operated contact member movable on the tilting member, thermostatic means for actuating the tilting member only on a rapid increase of temperature, and means on the tilting member for automatically preventing operative movement of the movable contact member when the thermostat is subjected to a sudden jar.

7. In a thermostat, the combination with an expansible disk, a member restraining expansion of the disk and formed of a material of relatively low heat conductivity as compared with said disk, a tilting member connected to said disk and adapted to be tilted by the expansion of the disk, gravity operated circuit closing means on said tilting member, and means for adjusting the connections between the tilting member and disk, whereby the operation of the circuit closing means can be regulated.

8. In a thermostat, the combination with an expansible disk, a member restraining expansion of the disk and formed of a material of relatively low heat conductivity as compared with said disk, a tilting member actuated by the expansion of said disk, a connecting member secured to said tilting member and to said disk, the connecting member being pivotally secured to said tilting member and adjustably connected to said disk, and an adjusting nut connected to said disk and to said connecting member, whereby the tilting member may be adjusted relative to said disk.

In witness that I claim the foregoing I have hereunto subscribed my name this 19th day of February, 1914.

IMLE E. STOREY.

Witnesses:
EDMUND A. STRAUSE,
MARGUERITE BATES.